US012609047B2

(12) United States Patent (10) Patent No.: US 12,609,047 B2

Glaser et al. (45) Date of Patent: Apr. 21, 2026

(54) IN-VEHICLE PSYCHOMOTOR SKILL ASSESSMENT WHILE PARKED

(71) Applicant: GM Global Technology Operations LLC, Detroit, MI (US)

(72) Inventors: Daniel S. Glaser, Grand Blanc, MI (US); Joseph F. Szczerba, West Bloomfield, MI (US); Yi Guo Glaser, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 902 days.

(21) Appl. No.: 17/813,164

(22) Filed: Jul. 18, 2022

(65) Prior Publication Data

US 2024/0021100 A1 Jan. 18, 2024

(51) Int. Cl.
| | |
|---|---|
| *G09B 19/16* | (2006.01) |
| *G06V 20/59* | (2022.01) |
| G06Q 10/0639 | (2023.01) |
| G06Q 50/20 | (2012.01) |
| G09B 9/04 | (2006.01) |
| G09B 9/05 | (2006.01) |
| G09B 9/052 | (2006.01) |

(52) U.S. Cl.
CPC ........... *G09B 19/167* (2013.01); *G06V 20/59* (2022.01); *G06Q 10/06393* (2013.01); *G06Q 50/2057* (2013.01); *G09B 9/04* (2013.01); *G09B 9/05* (2013.01); *G09B 9/052* (2013.01)

(58) Field of Classification Search
CPC ........ G09B 19/167; G09B 9/052; G09B 9/05; G09B 9/04; G06V 20/59; G06Q 10/06393; G06Q 50/2057
See application file for complete search history.

(56) References Cited

U.S. PATENT DOCUMENTS

| | | | | | |
|---|---|---|---|---|---|
| 5,366,376 | A | * | 11/1994 | Copperman | .......... A63F 13/245 434/69 |
| 5,368,484 | A | * | 11/1994 | Copperman | ............. G09B 9/05 434/69 |

(Continued)

OTHER PUBLICATIONS

Engadget, "New Tesla Arcade Game Hands-On: Beach Buggy Racing 2", Jun. 20, 2019, https://www.youtube.com/watch?v= zqG6AAZ5JvA, pp. 1-22 (Year: 2019).*

*Primary Examiner* — Jack Yip

(74) *Attorney, Agent, or Firm* — Vivacqua Crane, PLLC

(57) ABSTRACT

A vehicle psychomotor driving skill assessment system includes an on-board inputs group in a vehicle including physiological sensors. An on-board computer receives input from the on-board inputs group. The on-board computer accesses one or more algorithms from a memory to perform a skill test, evaluates skill test data, accesses stored skill test results from previous performed skill tests and saved average skill test results, and generates a current skill test result including a psychomotor ability assessment. A vehicle screen is provided. A skill test image generated by the on-board computer and a current user skill test result including the psychomotor ability assessment are presented on the vehicle screen to assist the user in performing the skill test. The current user skill test result assists the user in determining a user capability to operate the vehicle following the skill test.

16 Claims, 7 Drawing Sheets

(56)            References Cited

U.S. PATENT DOCUMENTS

| | | | |
|---|---|---|---|
| 8,738,523 B1* | 5/2014 | Sanchez ................. | G06Q 40/00 |
| | | | 705/4 |
| 9,586,591 B1* | 3/2017 | Fields ..................... | G09B 5/00 |
| 2010/0055649 A1* | 3/2010 | Takahashi ........... | B60W 50/082 |
| | | | 434/62 |
| 2012/0098678 A1* | 4/2012 | Rathmacher ....... | G01C 21/3697 |
| | | | 340/576 |
| 2012/0239462 A1* | 9/2012 | Pursell ................... | G07C 5/085 |
| | | | 701/123 |
| 2015/0187224 A1* | 7/2015 | Moncrief .............. | G09B 9/052 |
| | | | 434/30 |
| 2016/0163217 A1* | 6/2016 | Harkness ................. | G09B 7/00 |
| | | | 434/65 |
| 2016/0303967 A1* | 10/2016 | Quix ................ | B60W 50/0098 |
| 2017/0091872 A1* | 3/2017 | Okumura ............... | G06Q 40/08 |
| 2017/0210388 A1* | 7/2017 | Wieskamp .......... | G07C 5/0808 |
| 2020/0005663 A1* | 1/2020 | Welles ................... | G09B 9/052 |
| 2020/0020244 A1* | 1/2020 | Best ....................... | G09B 9/052 |
| 2020/0057487 A1* | 2/2020 | Sicconi ................... | G06F 3/011 |
| 2020/0121179 A1* | 4/2020 | Prusky ................... | A61B 3/032 |
| 2020/0132486 A1* | 4/2020 | Hori ................... | G01C 21/3446 |
| 2021/0357670 A1* | 11/2021 | Wu ........................ | G06V 20/56 |

* cited by examiner

IN-VEHICLE PSYCHOMOTOR SKILL ASSESSMENT WHILE PARKED

INTRODUCTION

The present disclosure relates to vehicle user driving skill assessment systems and methods of assessing vehicle user driving skill.

Known vehicle user driving skill assessment systems commonly include chemical-based sensors to test a user such as a prospective operator by contact or breath if a vehicle user blood alcohol level is above a predetermined range and warrants precluding operation of the vehicle. Various known sensors including eye motion sensors, contact sensors, breath sensors, and the like may be used to further enhance the chemical-based sensors to identify if the vehicle user's impairment level due for example to alcohol, drugs or sleep deprivation warrant an operational warning or precluding operation of the vehicle.

While current vehicle user driving skill assessment systems achieve their intended purpose, there is a need for a new and improved vehicle user driving skill assessment system.

SUMMARY

According to several aspects, a vehicle psychomotor driving skill assessment system includes an on-board inputs group provided in a vehicle including one or more physiological sensors. An on-board computer receives input from the on-board inputs group. The on-board computer accesses one or more algorithms from a memory to perform a skill test, evaluates skill test data, accesses stored skill test results from previous user performed skill tests and saved average skill test results, and generates a current skill test result including a psychomotor ability assessment. A vehicle screen is provided. A skill test image generated by the on-board computer is presented on the vehicle screen to assist the user in performing the skill test. A current user skill test result including a psychomotor ability assessment is presented on the vehicle screen. The current user skill test result assists the user in determining a user capability to operate the vehicle following the skill test.

In another aspect of the present disclosure, at least one of a vehicle steering wheel, an accelerator pedal and a brake pedal is actuated by the user to simulate an actual vehicle operation. The on-board inputs group includes a steering wheel angle sensor, a vehicle braking sensor and a vehicle acceleration sensor.

In another aspect of the present disclosure, a drive train or a transmission control is reviewed by the user prior to operation of the skill test to confirm the vehicle is in a park mode.

In another aspect of the present disclosure, the on-board inputs group includes a camera eye tracker.

In another aspect of the present disclosure, the skill test image defines an eye tracking skill test image presented on the vehicle screen by the on-board computer having a travel path presented from a start point along multiple path portions leading to an end point. The eye tracking skill test image and the camera eye tracker are used to test a user capability and accuracy to visually track the travel path from the start point to the end point with a user eye.

In another aspect of the present disclosure, the skill test image defines a finger tracking skill test image presented on the vehicle screen by the on-board computer having a travel path presented from a start point along multiple path portions leading to an end point. The finger tracking skill test image is used to test a user capability and accuracy to visually track the travel path from the start point to the end point with a user finger.

In another aspect of the present disclosure, the skill test image defines a full driving skill test image generated and presented on the vehicle screen having a vehicle image presented onto a roadway image defining a stop and turn roadway image generated by the on-board computer. The stop and turn roadway image includes a first roadway portion, a road sign requiring the user to conduct a vehicle turn onto a second roadway portion about a predetermined turning path. The full driving skill test image is used to identify a user steering control and accuracy, a user braking smoothness, a user acceleration smoothness and a quantity of lane excursions.

In another aspect of the present disclosure, the vehicle screen includes a first vehicle screen defining a gage cluster, a second vehicle screen defining a high-mounted head-down screen and a third vehicle screen defining a head-up screen.

In another aspect of the present disclosure, at least one of a system initiation switch is manually actuated by the user, and an auditory command is stated by the user to initiate operation of the skill test. System operation power is provided when the user selects a vehicle accessory power-on mode.

In another aspect of the present disclosure, historical personal best and worst skill test scores for comparison purposes are presented on the vehicle screen together with the current skill test results.

According to several aspects, a vehicle psychomotor driving skill assessment system includes an on-board inputs group provided in a vehicle. An on-board computer receives input from the on-board inputs group. The on-board computer accesses one or more algorithms from a memory to perform a skill test. A vehicle screen is provided. A skill test image is generated by the on-board computer and presented on the vehicle screen to assist the user in performing the skill test. A vehicle steering wheel, a vehicle accelerator pedal and a vehicle brake pedal is actuated by the user in a vehicle park mode to simulate operation of the vehicle during the skill test. Vehicle position sensors of the vehicle steering wheel, the vehicle accelerator pedal and the vehicle brake pedal sense and report position changes to the on-board computer indicating maintenance or deviation from a predetermined driving test threshold.

In another aspect of the present disclosure, a first longitudinal driving skill image is presented on the vehicle screen having a vehicle image generated by the on-board computer onto a roadway image, the first longitudinal driving skill image testing a user capability to maintain a substantially constant vehicle speed.

In another aspect of the present disclosure, a second longitudinal driving skill image is generated and presented on the vehicle screen, having the vehicle image generated by the on-board computer onto the roadway image, the second longitudinal driving skill assessment testing a user capability to maintain a substantially constant predetermined vehicle-to-vehicle spacing distance.

In another aspect of the present disclosure, a third longitudinal driving skill image is generated and presented on the vehicle screen, having the vehicle image generated by the on-board computer onto the roadway image, the third longitudinal driving skill image testing a user reaction time to apply the vehicle brake pedal after brake lights of a second vehicle image also presented on the vehicle screen are indicated ON.

In another aspect of the present disclosure, the on-board computer evaluates skill test data, accesses stored skill test results from previous user performed skill tests and saved average skill test results and generates a current skill test result including a psychomotor ability assessment.

In another aspect of the present disclosure, the psychomotor ability assessment includes results in increments of an average value range having a population average score on previous skill tests in a first band, a personal average score of the user taken over time in a second band, an advised minimum test score for the user to judge if a minimum standard has been met on the most recent tests performed by the user and a current user assessment score for a most recently completed skill test taken by the user.

In another aspect of the present disclosure, if the user current assessment score presents below the advised minimum test score and vehicle operation is not recommended, an options list is presented to the user on the vehicle screen. The options list includes at least one icon presenting a party to contact including a police emergency icon, a vehicle communication system icon, a first ride calling icon, a second ride calling icon, a home phone icon and a friend phone icon.

According to several aspects, a method for performing a vehicle psychomotor driving skill assessment, comprises: providing an on-board inputs group in a vehicle including one or more physiological sensors; forwarding an input from the on-board inputs group to an on-board computer; operating the on-board computer to access one or more algorithms from a memory to perform a skill test, to evaluate skill test data, to access stored skill test results from previous user performed skill tests and for saved average skill test results, and to generate a current user skill test result including a psychomotor ability assessment; generating a skill test image by the on-board computer and presenting the skill test image on the vehicle screen to assist the user in performing the skill test; and presenting the current user skill test result including the psychomotor ability assessment on the vehicle screen, the current user skill test result assisting the user in determining a user capability to actually operate the vehicle following the skill test.

In another aspect of the present disclosure, the method further includes: performing a physiological sensing operation using sensors of the vehicle; and presenting a visual suggestion that the user take the skill test when a user physiological condition fits within a predetermined range.

In another aspect of the present disclosure, the method further includes: switching the vehicle to test mode; applying a steering wheel, an accelerator pedal and a brake pedal as input devices; following instructions provided on the screen and operating vehicle controls including the steering wheel, the accelerator pedal and the brake pedal to perform the skill test; and measuring a user psychomotor ability using vehicle sensors and communicating the user psychomotor ability to the on-board computer.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
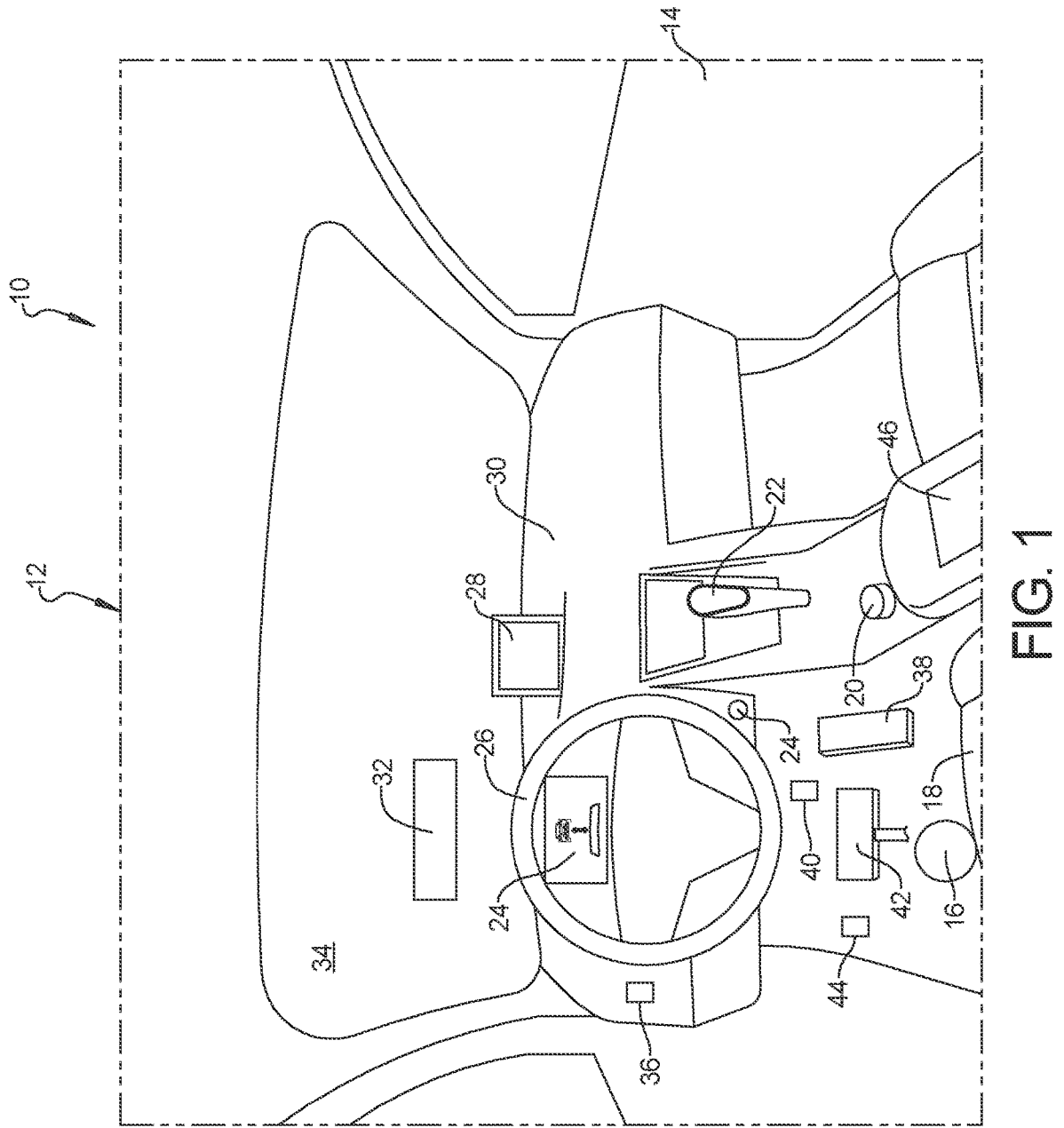
FIG. 1 is a perspective elevational view looking forward of a vehicle driving skill assessment system and method according to an exemplary aspect.

Referring to FIG. 1, a vehicle psychomotor driving skill assessment system 10 and method is operated within a passenger compartment 12 of a vehicle 14 such as a motor vehicle, a sport utility vehicle, a truck, a van, an electric vehicle, an autonomously operated vehicle and the like. A user 16 such as a prospective vehicle operator present in the passenger compartment 12 and seated for example in a driver-side vehicle seat 18 who wishes to perform a self-evaluation of the user's motor skills, an ability to operate the vehicle 14 under multiple standard driving conditions, receive test results and compare the user's test results to a general population average of test results, and the like, may manually actuate a system initiation switch 20, or state an auditory command to initiate operation of the vehicle psychomotor driving skill assessment system 10 and method. To perform the test, a drive train or transmission control 22 is reviewed to ensure the vehicle 14 is initially confirmed to be in a park mode. System operation power is provided by the user 16 selecting a vehicle power-on mode such as an "acc" or vehicle ignition ON position.

After the user 16 initiates operation of the vehicle psychomotor driving skill assessment system 10 and method a vehicle screen such as a first vehicle screen 24 presents system queries and selections for the user 16 to select from, and to present system test screens and test results. According to several aspects, the vehicle screen including the first vehicle screen 24 may define a gage cluster visible proximate to a vehicle steering wheel 26. In lieu of the first vehicle screen 24, a second vehicle screen 28 such as a high mounted head down screen which may be mounted on or extends from a vehicle dashboard for example, or a third vehicle screen 32 such as a head-up screen visible in a vehicle windshield 34 may be used to screen system information and test results.

Following selection of the test conditions by the user 16, the vehicle psychomotor driving skill assessment system 10 utilizes existing vehicle components and position sensors such as a steering wheel position sensor 36 connected to the vehicle steering wheel 26, a vehicle accelerator pedal 38 having an accelerator pedal position sensor 40 and a vehicle brake pedal 42 having a brake pedal position sensor 44 to allow the user 16 to mimic actual vehicle operational control as the user views screen test images presented on one of the first vehicle screen 24, the second vehicle screen 28 or the third vehicle screen 32 which are discussed in greater detail in reference to FIGS. 2 through 10 below. The vehicle psychomotor driving skill assessment system 10 utilizes an on-board computer 46 receiving input from the steering wheel position sensor 36 of the vehicle steering wheel 26, the accelerator pedal position sensor 40 of the vehicle accelerator pedal 38, the brake pedal position sensor 44 of the vehicle brake pedal 42, in addition of other existing vehicle sensors to perform the psychomotor driving skill tests, and to generate and display the test screens and test results.

The on-board computer 46 described in reference to FIG. 1 is a non-generalized, electronic control device having a preprogrammed digital controller or processor, memory or non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
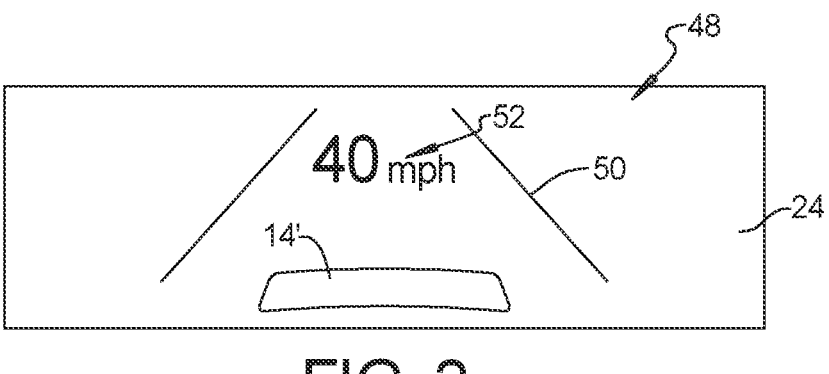
FIG. 2 is a front elevational view looking forward of a first test screen of the system of FIG. 1 presented on a vehicle screen.
Figure 3:
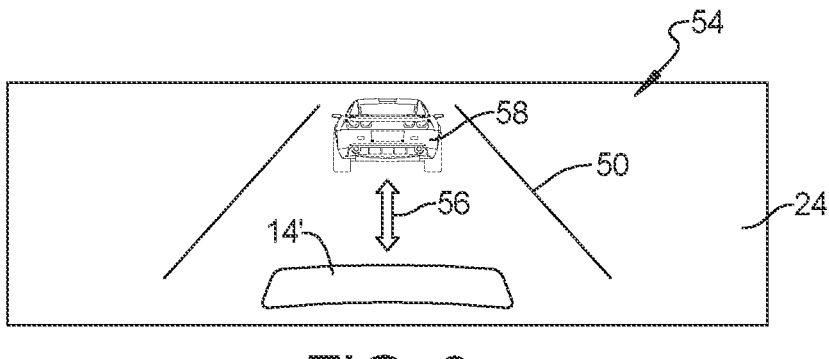
FIG. 3 is a front elevational view looking forward of a second test screen of the system of FIG. 1 presented on the vehicle screen.
Figure 4:
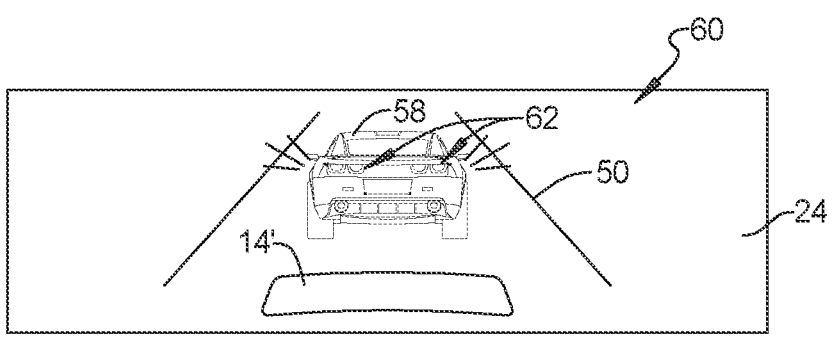
FIG. 4 is a front elevational view looking forward of a third test screen of the system of FIG. 1 presented on the vehicle screen.

Referring generally to FIGS. 2 through 11 and again to FIG. 1, the following discussions present driving skill assessment screens presented on the first vehicle screen 24, however any of the second vehicle screen 28 or the third vehicle screen 32 may also be used. Referring now to FIGS. 2 through 4, the vehicle psychomotor driving skill assessment system 10 initially performs a series of three longitudinal driving skill assessment tests as follows.

Referring more specifically to FIG. 2 and again to FIG. 1, a first longitudinal driving skill test image 48 is generated and presented on the first vehicle screen 24. A vehicle image 14' of the user vehicle 14 is generated by the on-board computer 46 onto a roadway image 50. The first longitudinal driving skill test image 48 tests the user's ability to maintain a substantially constant vehicle speed 52 presented on the first vehicle screen 24 to the user 16 while keeping the vehicle image 14' within the confines of a computer-generated roadway indicated by the roadway image 50. The user 16 actuates the vehicle steering wheel 26, the vehicle accelerator pedal 38 and the vehicle brake pedal 42 as the vehicle image 14' translates along the roadway image 50, and the vehicle position sensors of the vehicle steering wheel 26, the vehicle accelerator pedal 38 and the vehicle brake pedal 42 sense and report position changes to the on-board computer 46 which indicate maintenance or deviation from the predetermined vehicle speed 52. Deviations from the predetermined vehicle speed 52 as speed variations above or below a predetermined threshold, for example by changes in position of the vehicle accelerator pedal 38 made by the user 16 which mimic real-world vehicle speeds saved in a memory of the on-board computer 46, are recorded and saved in the memory of the on-board computer 46.

Referring to FIG. 3 and again to FIG. 1, a second longitudinal driving skill test image 54 is generated and presented on the first vehicle screen 24. The vehicle image 14' of the user vehicle 14 is generated by the on-board computer 46 onto the roadway image 50 as noted above in reference to FIG. 2. The second longitudinal driving skill test image 54 tests the user's ability to maintain a substantially constant predetermined vehicle-to-vehicle spacing distance 56 presented on the first vehicle screen 24 to the user 16 between the vehicle image 14' and a second vehicle image 58 while keeping the vehicle image 14' within the confines of the computer-generated roadway indicated by the roadway image 50. A vehicle headway, a vehicle acceleration smoothness and a vehicle deceleration smoothness may be generated. The user 16 actuates the vehicle steering wheel 26, the vehicle accelerator pedal 38 and the vehicle brake pedal 42 as the vehicle image 14' translates along the roadway image 50, and the vehicle position sensors of the vehicle steering wheel 26, the vehicle accelerator pedal 38 and the vehicle brake pedal 42 sense and report position changes to the on-board computer 46 which indicate maintenance or deviation from the predetermined vehicle-to-vehicle spacing distance 56. Deviations from the predetermined vehicle-to-vehicle spacing distance 56 above or below a predetermined threshold, for example by changes in position of the vehicle accelerator pedal 38 made by the user 16 which mimic real-world vehicle speeds saved in the memory of the on-board computer 46 are recorded and saved in the memory of the on-board computer 46.

Referring to FIG. 4 and again to FIG. 1, a third longitudinal driving skill test image 60 is generated and presented on the first vehicle screen 24. The vehicle image 14' of the user vehicle 14 is generated by the on-board computer 46 onto the roadway image 50 as noted above in reference to FIG. 2. The third longitudinal driving skill test image 60 tests a user's reaction time to apply the vehicle brake pedal 42 after brake lights 62 of the second vehicle image 58 are indicated ON as presented on the first vehicle screen 24 to the user 16 while keeping the vehicle image 14' within the confines of the computer-generated roadway indicated by the roadway image 50. The user 16 primarily actuates the vehicle brake pedal 42 and may also operate the vehicle steering wheel 26 and the vehicle accelerator pedal 38 as both the vehicle image 14' and the second vehicle image 58 translate along the roadway image 50, and the vehicle position sensors of the vehicle steering wheel 26, the vehicle accelerator pedal 38 and the vehicle brake pedal 42 sense and report position changes to the on-board computer 46 which indicate the user's reaction time to apply the vehicle brake pedal 42. The user's reaction time to apply the vehicle brake pedal 42 providing a time to brake are recorded and saved in the memory of the on-board computer 46 and are compared for example to an average user reaction time saved in the memory of the on-board computer 46.

Figure 5:
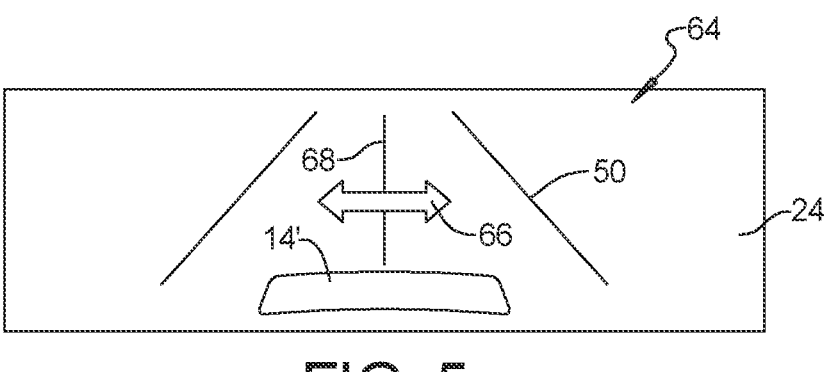
FIG. 5 is a front elevational view looking forward of a fourth test screen of the system of FIG. 1 presented on the vehicle screen.
Figure 6:
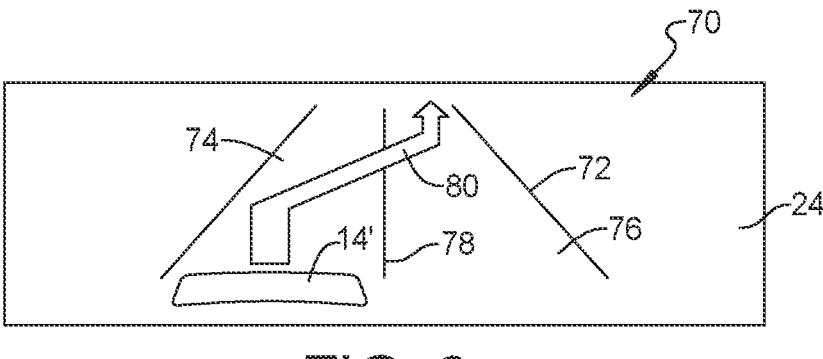
FIG. 6 is a front elevational view looking forward of a fifth test screen of the system of FIG. 1 presented on the vehicle screen.
Figure 7:
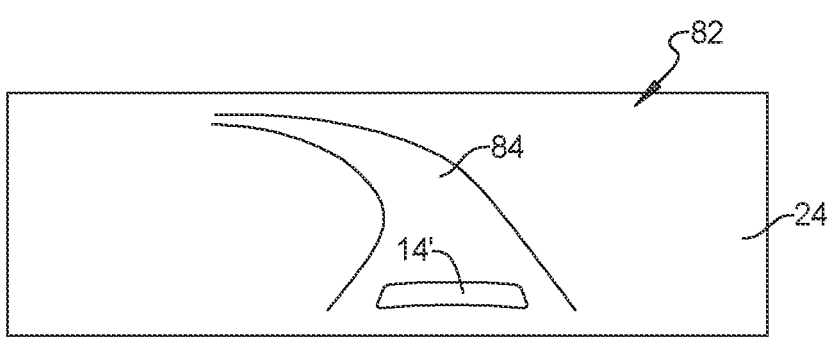
FIG. 7 is a front elevational view looking forward of a sixth test screen of the system of FIG. 1 presented on the vehicle screen.
Figure 8:
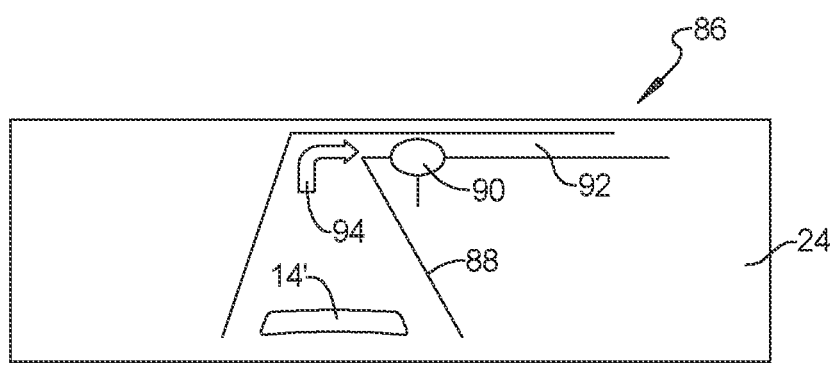
FIG. 8 is a front elevational view looking forward of a seventh test screen of the system of FIG. 1 presented on the vehicle screen.

Referring now to FIGS. 5 through 7, the vehicle psychomotor driving skill assessment system 10 further performs a series of three lateral driving skill assessment tests as follows. Referring more specifically to FIG. 5 and again to FIG. 1, a first lateral driving skill test image 64 is generated and presented on the first vehicle screen 24. The vehicle image 14' of the user vehicle 14 is generated by the on-board computer 46 onto the roadway image 50. The first lateral driving skill test image 64 tests the user's ability to maintain a substantially constant predetermined side-to-side displacement 66 of the vehicle image 14' compared to roadway centerline 68 presented on the first vehicle screen 24 to the user 16 while also keeping the vehicle image 14' within the confines of the computer-generated roadway indicated by the roadway image 50. The user 16 actuates the vehicle steering wheel 26, the vehicle accelerator pedal 38 and the vehicle brake pedal 42 as the vehicle image 14' translates along the roadway image 50, and the vehicle position sensors of the vehicle steering wheel 26, the vehicle accelerator pedal 38 and the vehicle brake pedal 42 sense and report position changes to the on-board computer 46 which indicate maintenance or deviation from the predetermined side-to-side displacement 66. Deviations from the predetermined side-to-side displacement 66 as deviations from the roadway centerline 68 above or below a predetermined threshold, for example by changes in position of the vehicle steering wheel 26 made by the user 16 which mimic real-world vehicle lateral displacements saved in a memory of the on-board computer 46 are recorded and saved in the memory of the on-board computer 46.

Referring to FIG. 6 and again to FIG. 1, a second lateral driving skill test image 70 is generated and presented on the first vehicle screen 24. The vehicle image 14' of the user vehicle 14 is generated by the on-board computer 46 onto a roadway image 72 having a first driving lane 74, a second driving lane 76 and a lane centerline 78 demarking a division between the first driving lane 74 and the second driving lane 76. The second lateral driving skill test image 70 tests the user's steering smoothness and an driving accuracy in clearing the lane centerline 78 as the vehicle image 14' progresses in a predetermined lane change operation 80 presented on the first vehicle screen 24 to the user 16 while also keeping the vehicle image 14' within the confines of the computer-generated roadway indicated by the roadway image 72. The user 16 actuates the vehicle steering wheel 26, the vehicle accelerator pedal 38 and the vehicle brake pedal 42 as necessary as the vehicle image 14' translates along the roadway image 72, and the vehicle position sensors of the vehicle steering wheel 26, the vehicle accelerator pedal 38 and the vehicle brake pedal 42 sense and report position changes to the on-board computer 46 which indicate maintenance or deviation from the predetermined lane change operation 80. A steering smoothness and an accuracy of maintaining vehicle position with respect to the vehicle lane centerline 78 are determined. Deviations from the predetermined lane change operation 80 above or below a predetermined threshold, for example by changes in position of the vehicle steering wheel 26 made by the user 16 which mimic real-world vehicle lateral displacements saved in a memory of the on-board computer 46 are recorded and saved in the memory of the on-board computer 46.

Referring to FIG. 7 and again to FIG. 1, a third lateral driving skill test image 82 is generated and presented on the first vehicle screen 24. The vehicle image 14' of the user vehicle 14 is generated by the on-board computer 46 onto a roadway image 84 defining a curving road section. The third lateral driving skill test image 82 tests the user's steering smoothness and an driving accuracy in travelling the roadway image 84 as the vehicle image 14' progresses between edges of the roadway image 84 presented on the first vehicle screen 24 to the user 16 while also keeping the vehicle image 14' within the confines of the computer-generated roadway indicated by the roadway image 84. The user 16 actuates the vehicle steering wheel 26, the vehicle accelerator pedal 38 and the vehicle brake pedal 42 as necessary as the vehicle image 14' translates along the roadway image 84, and the vehicle position sensors of the vehicle steering wheel 26, the vehicle accelerator pedal 38 and the vehicle brake pedal 42 sense and report position changes to the on-board computer 46 which indicate maintenance or deviation of travel within and outside of the roadway image 84. A steering smoothness, a quantity of any lane excursions and an accuracy of maintaining vehicle position with respect to the lane defined by the roadway image 84 are determined. Deviations above or below a predetermined threshold, for example by changes in position of the vehicle steering wheel 26 made by the user 16 which mimic real-world vehicle lateral displacements saved in a memory of the on-board computer 46 are recorded and saved in the memory of the on-board computer 46.

Referring to FIG. 8 and again to FIG. 1, the vehicle psychomotor driving skill assessment system 10 further performs a full driving test image 86 which is generated and presented on the first vehicle screen 24. The vehicle image 14' of the user vehicle 14 is generated by the on-board computer 46 onto a roadway image defining a stop and turn roadway condition. The vehicle image 14' of the user vehicle 14 is generated by the on-board computer 46 onto a first roadway portion 88 defining a straight road section. A road sign 90 such as a stop sign is presented along the first roadway portion 88 requiring in this example the user 16 to brake the vehicle 14' and conduct a vehicle turn onto a second roadway portion 92 about a predetermined turning path 94. The full driving test image 86 tests the user's steering control and accuracy, user braking smoothness, user acceleration smoothness and a quantity or number of lane excursions. The user 16 actuates the vehicle steering wheel 26, the vehicle accelerator pedal 38 and the vehicle brake pedal 42 as necessary as the vehicle image 14' translates along the first roadway portion 88, the second roadway portion 92 and the predetermined turning path 94. The vehicle position sensors of the vehicle steering wheel 26, the vehicle accelerator pedal 38 and the vehicle brake pedal 42 sense and report position changes to the on-board computer 46 which indicate maintenance or deviation of travel along the first roadway portion 88, the second roadway portion 92 and the predetermined turning path 94. Deviations above or below a predetermined threshold, for example by changes in position of the vehicle steering wheel 26 made by the user 16 which mimic real-world vehicle displacements saved in a memory of the on-board computer 46 are recorded and saved in the memory of the on-board computer 46.

Figure 9:
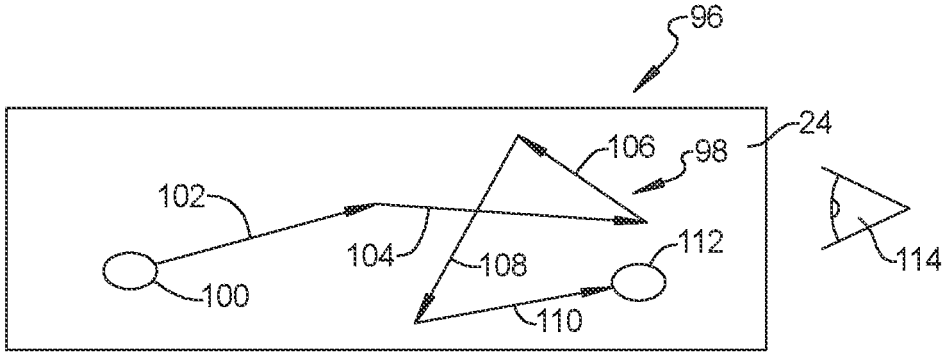
FIG. 9 is a front elevational view looking forward of an eye movement acuity test screen of the system of FIG. 1 presented on the vehicle screen.
Figure 10:
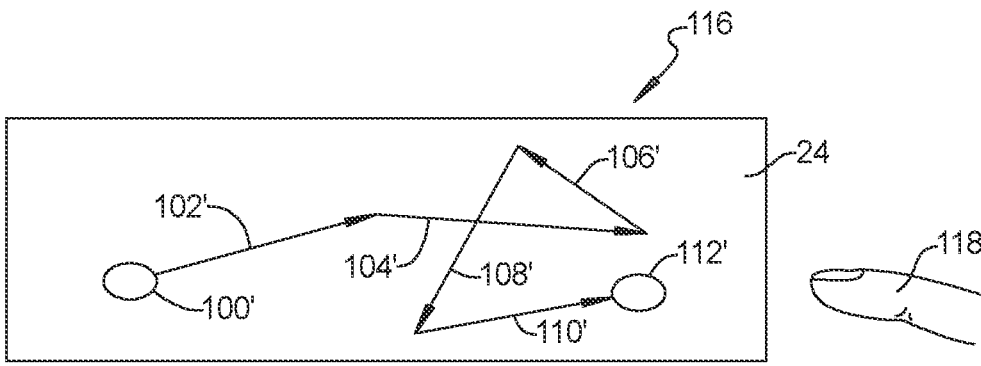
FIG. 10 is a front elevational view looking forward of a finger movement acuity test screen of the system of FIG. 1 presented on the vehicle screen.

Referring now to FIGS. 9 and 10, the vehicle psychomotor driving skill assessment system 10 further performs a series of two vehicle screen skill assessment tests as follows. Referring more specifically to FIG. 9 and again to FIG. 1, an eye tracking skill test image 96 is generated and presented on the first vehicle screen 24. A travel path 98 is presented from a start point 100 along a first path portion 102, a second path portion 104, a third path portion 106, a fifth path portion 108, and a sixth path portion 110 leading to an end point 112.

The eye tracking skill test image 96 tests the user's ability and accuracy to visually track the travel path 98 from the start point 100 to the end point 112 using a user's eye 114. Deviations above or below a predetermined tracking threshold, for example distance deviations away from the travel path 98 saved in a memory of the on-board computer 46 are recorded and saved in the memory of the on-board computer 46.

Referring more specifically to FIG. 10 and again to FIGS. 1 and 9, a finger tracking skill test image 116 is generated and presented on the first vehicle screen 24. The travel path 98', which is similar to the travel path 98 is presented from the start point 100' along the first path portion 102', the second path portion 104', the third path portion 106', the fifth path portion 108', and the sixth path portion 110' leading to the end point 112'. The finger tracking skill test image 116 testing a user capability and accuracy to manually track the travel path 98' from the start point 100' to the end point 112' using a user's finger 118. Deviations above or below a predetermined tracking threshold, for example distance deviations away from the travel path 98' saved in a memory of the on-board computer 46 are recorded and saved in the memory of the on-board computer 46.

Referring to FIG. 11 and again to FIGS. 1 through 9, a psychomotor skills assessment summary graph 120 is generated by the on-board computer 46 at a conclusion of any or all of the above noted skill and tracking tests presenting summaries of the skill and tracking tests on the first vehicle screen 24. The psychomotor skills assessment summary graph 120 presents results for example in 20% increments of an average value range 122 having a population average score 124 on the various tests in a first band 126, and a personal average score 128 of the user 16 taken over time of multiple tests in a second band 130. An advised minimum test score 132 may be presented for the user 16 to judge if a minimum standard has been met on the most recent tests performed by the user 16. A current assessment score 134 for the most recently completed tests by the user 16 is also presented. In the example provided, the current assessment score 134 of approximately 55% is below the advised minimum test score 132 of approximately 65%, therefore indicating a skills assessment below the advised minimum ability to operate the vehicle 14 at the present time.

A personal range 136 of test scores of the user 16 may be superimposed onto the psychomotor skills assessment summary graph 120, which may extend above or below the average value range 122. If, as indicated by the exemplary psychomotor skills assessment summary graph 120 presented herein, the user current assessment score 134 presents below the advised minimum test score 132, vehicle operation is not recommended. When vehicle operation is not recommended an options list 138 is presented to the user 16 on the first vehicle screen 24. The options list 138 may include one or more icons for parties to contact including a police emergency icon 140, a vehicle communication system icon 142, a first ride calling icon 144, a second ride calling icon 146, a home phone icon 148 and a friend phone icon 150.

Figure 11:
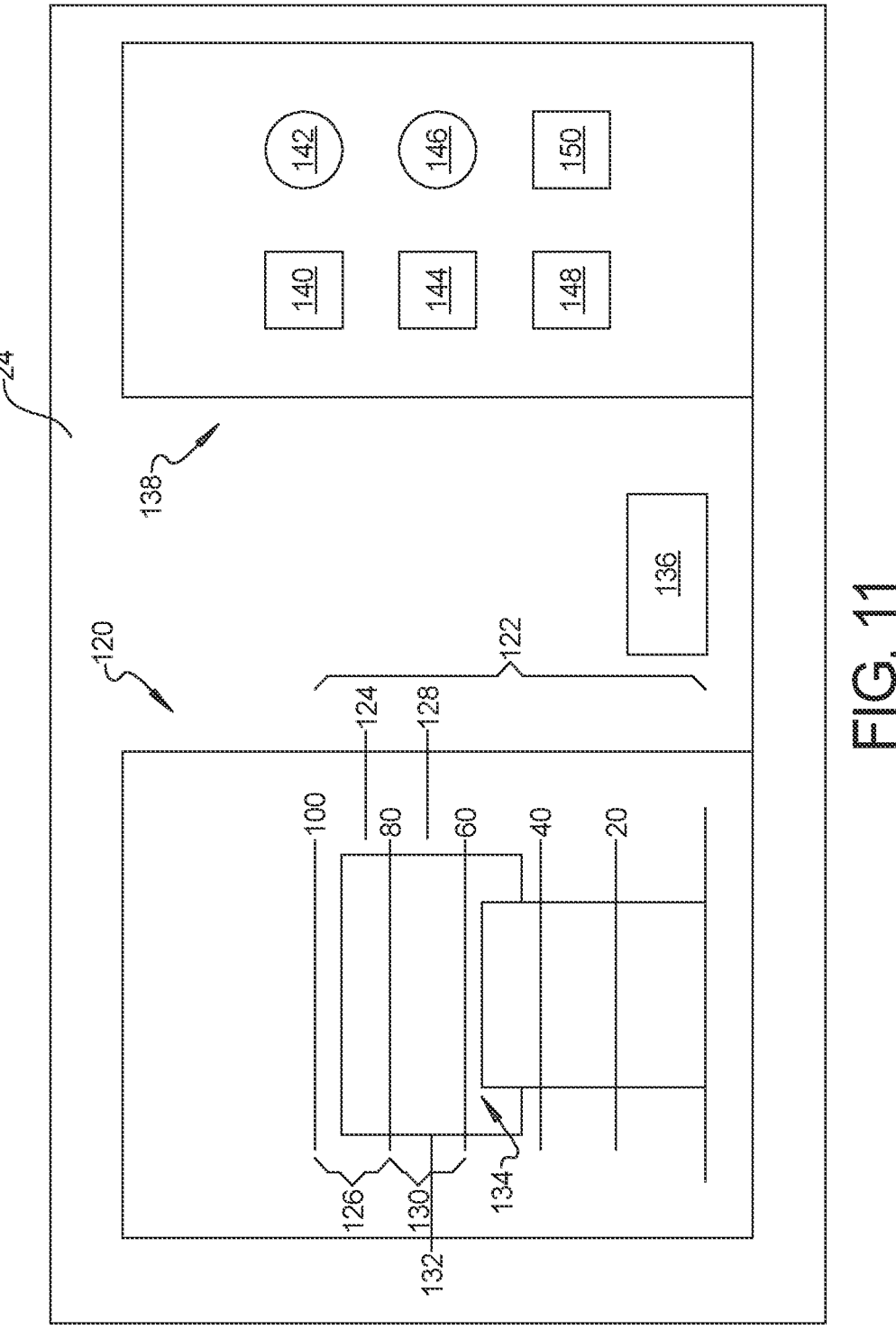
FIG. 11 is a front elevational view looking forward of a test results presentation screen of the system of FIG. 1 presented on the vehicle screen.
Figure 12:
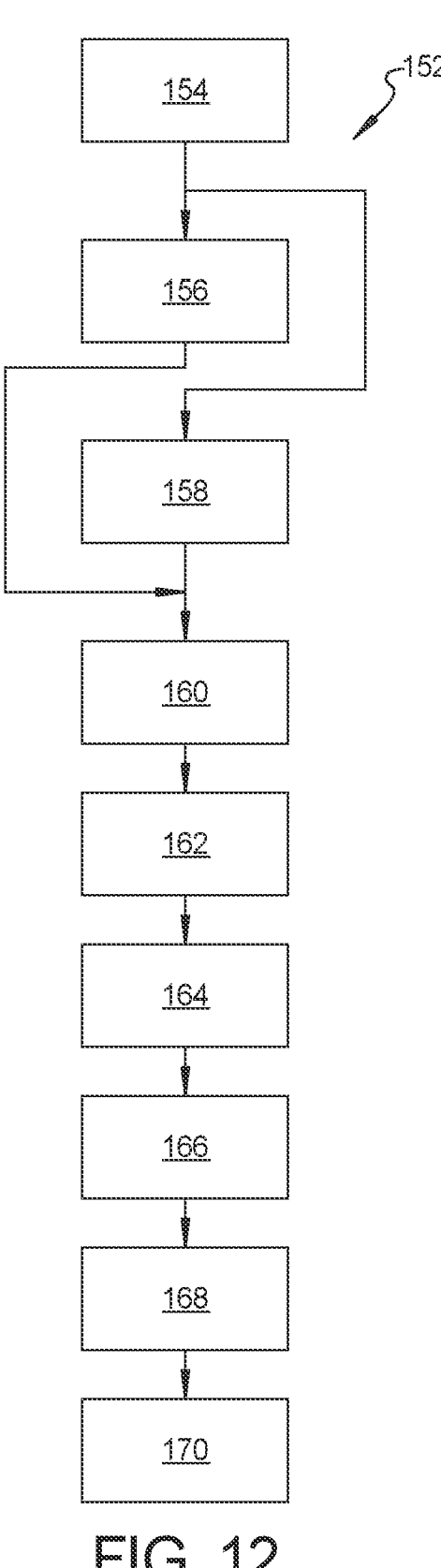
FIG. 12 is a system flowchart of steps to perform a vehicle driving skill assessment of the present disclosure.

Referring to FIG. 12 and again to FIGS. 1 and 11, a vehicle psychomotor driving skill assessment system flowchart 152 provides operation steps for operating the vehicle psychomotor driving skill assessment system 10 of the present disclosure. In an initial step 154, the user 16 enters the vehicle 14. The vehicle 14 using sensors of the vehicle 14 then performs a physiological sensing operation 156 and when a user's physiological condition appears to fit within a predetermined range presents a visual suggestion that the user 16 take the psychomotor skills assessment tests presented above. In parallel with the physiological sensing operation 156 if the physiological sensing operation 156 does not result in a suggestion to perform the testing, the user 16 in a manual election step 158 may manually elect to initiate operation of the vehicle psychomotor driving skill assessment system 10.

In a switching step 160, the vehicle 14 is switched to test mode. In a following step 162 the steering wheel 26, the accelerator pedal 38 and the brake pedal 42 applied as input devices. In a presentation step 164 gage cluster, head-up-screens and similar screens including the screens such as the first vehicle screen 24 are operated to present testing data. In an operational step 166 the user 16 follows instructions provided on the various displays or screens and operates vehicle controls including the steering wheel 26, the accelerator pedal 38 and the brake pedal 42 to perform the various skills tests. In a measuring step 168 the sensors of vehicle 14 measure the user's psychomotor abilities which are communicated to the on-board computer 46. In a results step 170 skill test results and recommendations are shown to the user 16 comparing a current user assessment for operation of the vehicle 14oc to the user's previous recorded averages and ranges from previously performed skills tests.

Figure 13:
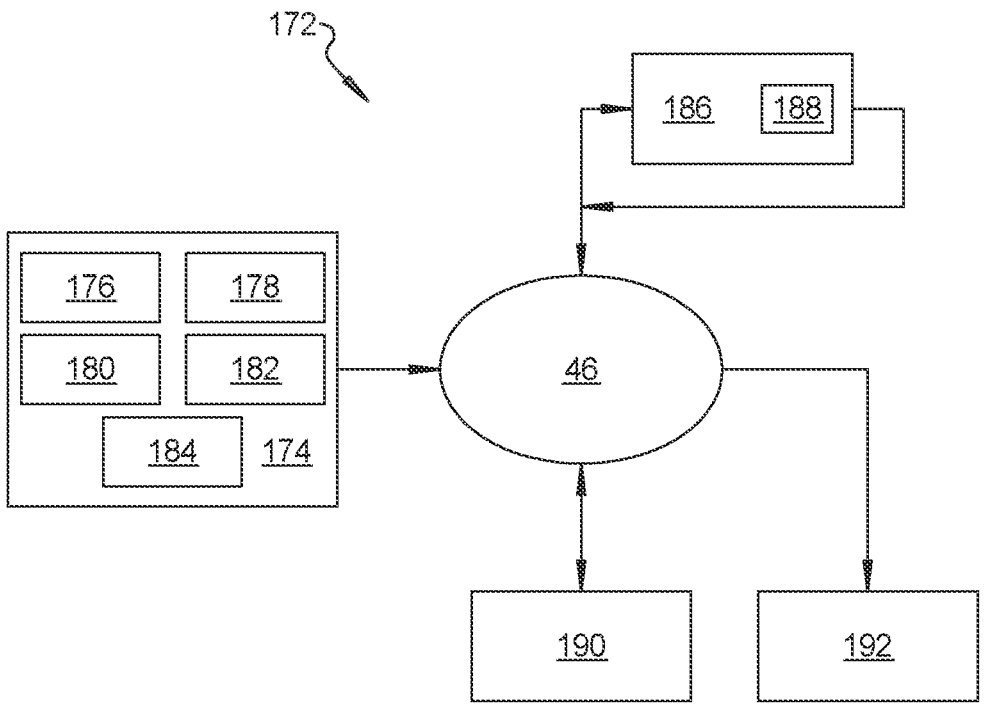
FIG. 13 is a system component diagram identifying system components used to perform a vehicle driving skill assessment of the present disclosure.

Referring to FIG. 13 and again to FIGS. 1 through 12, a system component diagram 172 identifies components used for the vehicle psychomotor driving skill assessment system 10. An on-board inputs group 174 includes a driver monitoring system (DMS) or a camera eye tracker 176, a steering wheel angle sensor 178, a vehicle braking sensor 180, a vehicle acceleration sensor 182 and one or more physiological sensors 184. Inputs from the on-board inputs group 174 are forwarded to the on-board computer 46. The on-board computer accesses one or more algorithms 186 from a memory 188 for use during the skills testing and results presentations of the vehicle psychomotor driving skill assessment system 10. The on-board computer 46 also receives data from and sends screen data to one or more of the vehicle screens 190 including the first vehicle screen 24, the second vehicle screen 28 or the third vehicle screen 32. The on-board computer 46 evaluates skills test data, accesses stored test results from previous user performed tests and for saved average test results, generates skill test results and generates a psychomotor ability assessment 192 including the data presented in FIG. 11.

The vehicle driving skill assessment system and method 10 of the present disclosure allows a user to test psychomotor driving skills before driving the vehicle and while the vehicle is parked. The vehicle uses physiological measures to initially assess if the user should perform the assessment. The vehicle system or the user initially selects the driving mode test. The existing vehicle controls for the steering wheel and the foot pedals are used for the test. A gage cluster, a high-mounted head-down screen, or a head-up screen may be used as a driving test interface. The user follows directions presented on the driving test interface and operates the vehicle steering wheel and the pedals to simulate actual vehicle operation. During the test, the system measures the user's abilities. Current user results are then presented to the user along with historical personal best and worst test scores for comparison purposes, to assist the user in determining the user's ability to actually operate the vehicle following the test.

Assessing impairment using the system of the present disclosure is performed via direct behavioral testing and does not require or employ the use of chemical sensors. The vehicle driving skill assessment system and method of the present disclosure repurposes existing vehicle hardware meant for controlling the vehicle, information, and entertainment to assess the user's fitness. The system provides a complimentary, not a redundant extension to the typical chemical sensor-based driver fitness estimation systems.

The vehicle driving skill assessment system and method assesses a user's psychomotor abilities required for driving. The vehicle driving skill assessment system and method applies physiological measures to assess the user's ability to drive. The system uses existing vehicle driving controls and displays to assess the user's driving abilities.

The vehicle psychomotor driving skill assessment system 10 and method uses sensors including an eye-tracker, a heart rate monitor, a speech assessment unit, and other physiological measurement devices. The vehicle primary controls are used as input devices. An on-board vehicle computer is used for performing the tests together with one or more algorithms to perform user psychomotor ability assessments prior to driving. One or more existing vehicle screens are used to initiate and perform the tests as a user interface and to present test results to the user.

The vehicle psychomotor driving skill assessment system 10 and method of the present disclosure offers several advantages. These include a system and method to perform a real-time psychomotor driving skill assessment inside a motor vehicle while the vehicle is parked. The driving skill assessment aids the user in determining a fitness of the user to drive the vehicle. When the vehicle and/or the user determines that they may be impaired, for example by consumption of alcohol, by drowsiness, by a neurological impairment or by a motor impairment, a vehicle psychomotor driving skill assessment system test of the present disclosure may be performed. The vehicle psychomotor driving skill assessment system 10 and method of the present disclosure utilizes a vehicle steering wheel and foot pedals as inputs and user reactions to images on a vehicle visual screen.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A vehicle psychomotor driving skill assessment system, comprising:
    an on-board inputs group provided in a vehicle including one or more physiological sensors;
    an on-board computer receiving input from the on-board inputs group, the on-board computer accessing one or more algorithms from a memory to perform a skill test, to evaluate skill test data, to access stored skill test results from a previously performed skill test and for saved average skill test results, and to generate a current skill test result including a psychomotor ability assessment;
    a vehicle screen;
    a skill test image generated by the on-board computer and presented on the vehicle screen to assist a user in performing the skill test, wherein the skill test image defines a full driving skill test image generated and presented on the vehicle screen having a vehicle image presented onto a roadway image defining a stop and turn roadway image generated by the on-board computer, the stop and turn roadway image including a first roadway portion, a road sign requiring the user to conduct a vehicle turn onto a second roadway portion about a predetermined turning path, the full driving skill test image used to identify a user steering control and accuracy, a user braking smoothness, a user acceleration smoothness and a quantity of lane excursions;
    a first lateral driving skill test image presented on the vehicle screen, having a vehicle image generated by the on-board computer onto a roadway image, the first lateral driving skill test image testing a user ability to maintain a substantially constant predetermined side-to-side displacement of the vehicle image compared to a roadway centerline;
    a second lateral driving skill test image presented on the vehicle screen having the vehicle image generated by the on-board computer onto the roadway image including a first driving lane, a second driving lane and a lane centerline demarking a division between the first driving lane and the second driving lane, the second lateral driving skill test image testing a user steering smoothness and a driving accuracy in clearing the lane centerline as the vehicle image progresses in a predetermined lane change operation; and
    a third lateral driving skill test image presented on the vehicle screen having the vehicle image generated by the on-board computer onto the roadway image defining a curving road section, the third lateral driving skill test image testing a user steering smoothness and a driving accuracy in travelling the roadway image as the vehicle image progresses between edges of the roadway image,
    wherein the current skill test result including the psychomotor ability assessment is presented on the vehicle screen,
    wherein the psychomotor ability assessment includes results in increments of an average value range having a population average score on previous skill tests in a first band, a personal average score of the user taken over time in a second band, an advised minimum test score for the user to judge if a minimum standard has been met on a most recent skill test performed by the user and a current user assessment score for the most recent skill test taken by the user, and
    wherein if the user current assessment score presents below the advised minimum test score and vehicle operation is not recommended an options list is presented to the user on the vehicle screen, the options list including presenting a party to contact including a police emergency icon, a vehicle communication system icon, a first ride calling icon, a second ride calling icon, a home phone icon, and a friend phone icon.

2. The vehicle psychomotor driving skill assessment system of claim 1, including a vehicle steering wheel, an accelerator pedal and a brake pedal actuated by the user to simulate an actual vehicle operation, wherein the on-board inputs group includes a steering wheel angle sensor, a vehicle braking sensor and a vehicle acceleration sensor.

3. The vehicle psychomotor driving skill assessment system of claim 2, including a drive train or a transmission control reviewed by the user prior to operation of the skill test to confirm the vehicle is in a park mode.

4. The vehicle psychomotor driving skill assessment system of claim 1, wherein the on-board inputs group includes a camera eye tracker.

5. The vehicle psychomotor driving skill assessment system of claim 4, wherein the skill test image defines an eye tracking skill test image presented on the vehicle screen by the on-board computer having a travel path presented from a start point along multiple path portions leading to an end point, the eye tracking skill test image and the camera eye tracker used to test a user accuracy to visually track the travel path from the start point to the end point with a user eye.

6. The vehicle psychomotor driving skill assessment system of claim 1, wherein the skill test image defines a finger tracking skill test image presented on the vehicle screen by the on-board computer having a travel path presented from a start point along multiple path portions leading to an end point, the finger tracking skill test image used to test a user accuracy to visually track the travel path from the start point to the end point with a user finger.

7. The vehicle psychomotor driving skill assessment system of claim 1, wherein the vehicle screen includes a first vehicle screen defining a gage cluster, a second vehicle screen defining a high-mounted head-down screen and a third vehicle screen defining a head-up screen.

8. The vehicle psychomotor driving skill assessment system of claim 1, including a system initiation switch manually actuated by the user to initiate operation of the skill test; and having system operation power provided when the user selects a vehicle accessory power-on mode.

9. The vehicle psychomotor driving skill assessment system of claim 1, including historical personal best and worst skill test scores for comparison purposes presented on the vehicle screen together with the current skill test result.

10. A vehicle psychomotor driving skill assessment system, comprising:

an on-board inputs group provided in a vehicle;

an on-board computer receiving input from the on-board inputs group, the on-board computer accessing one or more algorithms from a memory to perform a skill test and for saved average skill test results, and to generate a current skill test result including a psychomotor ability assessment;

a vehicle screen;

a skill test image generated by the on-board computer and presented on the vehicle screen to assist a user in performing the skill test, wherein the skill test image defines a full driving skill test image generated and presented on the vehicle screen having a vehicle image presented onto a roadway image defining a stop and turn roadway image generated by the on-board computer, the stop and turn roadway image including a first roadway portion, a road sign requiring the user to conduct a vehicle turn onto a second roadway portion about a predetermined turning path, the full driving skill test image used to identify a user steering control and accuracy, a user braking smoothness, a user acceleration smoothness and a quantity of lane excursions;

a first lateral driving skill test image presented on the vehicle screen, having a vehicle image generated by the on-board computer onto a roadway image, the first lateral driving skill test image testing a user ability to maintain a substantially constant predetermined side-to-side displacement of the vehicle image compared to a roadway centerline;

a second lateral driving skill test image presented on the vehicle screen having the vehicle image generated by the on-board computer onto the roadway image including a first driving lane, a second driving lane and a lane centerline demarking a division between the first driving lane and the second driving lane, the second lateral driving skill test image testing a user steering smoothness and a driving accuracy in clearing the lane centerline as the vehicle image progresses in a predetermined lane change operation;

a third lateral driving skill test image presented on the vehicle screen having the vehicle image generated by the on-board computer onto the roadway image defining a curving road section, the third lateral driving skill test image testing a user steering smoothness and a driving accuracy in travelling the roadway image as the vehicle image progresses between edges of the roadway image;

a vehicle steering wheel, a vehicle accelerator pedal and a vehicle brake pedal actuated by the user in a vehicle park mode to simulate operation of the vehicle during the skill test; and vehicle position sensors of the vehicle steering wheel, the vehicle accelerator pedal and the vehicle brake pedal sensing and reporting position changes to the on-board computer indicating maintenance or deviation from a predetermined driving test threshold, wherein the psychomotor ability assessment includes results in increments of an average value range having a population average score on previous skill tests in a first band, a personal average score of the user taken over time in a second band, an advised minimum test score for the user to judge if a minimum standard has been met on a most recent skill test performed by the user and a current user assessment score for the most recent skill test taken by the user, and wherein if the user current assessment score presents below the advised minimum test score and vehicle operation is not recommended an options list is presented to the user on the vehicle screen, the options list including presenting a party to contact including a police emergency icon, a vehicle communication system icon, a first ride calling icon, a second ride calling icon, a home phone icon, and a friend phone icon.

11. The vehicle psychomotor driving skill assessment system of claim 10, including a first longitudinal driving skill image presented on the vehicle screen having a vehicle image generated by the on-board computer onto a roadway image, the first longitudinal driving skill image testing a user capability to maintain a substantially constant vehicle speed.

12. The vehicle psychomotor driving skill assessment system of claim 11, including:

a second longitudinal driving skill image generated and presented on the vehicle screen, having the vehicle image generated by the on-board computer onto the roadway image, the second longitudinal driving skill image testing a user capability to maintain a substantially constant predetermined vehicle-to-vehicle spacing distance; and a third longitudinal driving skill image generated and presented on the vehicle screen, having the vehicle image generated by the on-board computer onto the roadway image, the third longitudinal driving skill image testing a user reaction time to apply the vehicle brake pedal after brake lights of a second vehicle image also presented on the vehicle screen are indicated ON.

13. The vehicle psychomotor driving skill assessment system of claim 10, wherein the on-board computer evaluates skill test data, accesses stored skill test results from previous user performed skill tests and saved average skill test results and generates a current skill test result including a psychomotor ability assessment, and including historical personal best and worst skill test scores for comparison purposes presented on the vehicle screen together with the current skill test result.

14. A method for performing a vehicle psychomotor driving skill assessment, comprising:

providing an on-board inputs group in a vehicle including one or more physiological sensors;

forwarding an input from the on-board inputs group to an on-board computer;

operating the on-board computer to access one or more algorithms from a memory to perform a skill test, to evaluate skill test data, to access stored skill test results from previous user performed skill tests and for saved average skill test results, and to generate a current user skill test result including a psychomotor ability assessment, the skill test including:

a first lateral driving skill test image presented on a vehicle screen, having a vehicle image generated by the on-board computer onto a roadway image, the first lateral driving skill test image testing a user ability to maintain a substantially constant predetermined side-to-side displacement of the vehicle image compared to a roadway centerline;

a second lateral driving skill test image presented on the vehicle screen having the vehicle image generated by the on-board computer onto the roadway image including a first driving lane, a second driving lane and a lane centerline demarking a division between the first driving lane and the second driving lane, the second lateral driving skill test image testing a user steering smoothness and a driving accuracy in clearing the lane centerline as the vehicle image progresses in a predetermined lane change operation; and a third lateral driving skill test image presented on the vehicle screen having the vehicle image generated by the on-board computer onto the roadway image defining a curving road section, the third lateral driving skill test image testing a user steering smoothness and a driving accuracy in travelling the roadway image as the vehicle image progresses between edges of the roadway image;

generating a skill test image by the on-board computer and presented the skill test image on the vehicle screen to assist a user in performing the skill test, wherein the skill test image defines a full driving skill test image generated and presented on the vehicle screen having a vehicle image presented onto a roadway image defining a stop and turn roadway image generated by the on-board computer, the stop and turn roadway image including a first roadway portion, a road sign requiring the user to conduct a vehicle turn onto a second roadway portion about a predetermined turning path, the full driving skill test image used to identify a user steering control and accuracy, a user braking smoothness, a user acceleration smoothness and a quantity of lane excursions; and presenting the current user skill test result including the psychomotor ability assessment on the vehicle screen, the current user skill test result assisting the user in determining a user capability to operate the vehicle following the skill test, wherein the psychomotor ability assessment includes results in increments of an average value range having a population average score on previous skill tests in a first band, a personal average score of the user taken over time in a second band, an advised minimum test score for the user to judge if a minimum standard has been met on a most recent skill test performed by the user and a current user assessment score for the most recent skill test taken by the user, and wherein if the user current assessment score presents below the advised minimum test score and vehicle operation is not recommended an options list is presented to the user on the vehicle screen, the options list including presenting a party to contact including a police emergency icon, a vehicle communication system icon, a first ride calling icon, a second ride calling icon, a home phone icon, and a friend phone icon.

15. The method of claim 14, further including:

performing a physiological sensing operation using sensors of the vehicle; and presenting a visual suggestion that the user take the skill test when a user physiological condition fits within a predetermined range.

16. The method of claim 15, further including:

switching the vehicle to test mode;

applying a steering wheel, an accelerator pedal and a brake;

pedal as input devices;

following instructions provided on the vehicle screen by the user and operating vehicle controls including the steering wheel, the accelerator pedal and the brake pedal to perform the skill test; and measuring a user psychomotor ability using vehicle sensors and communicating the user psychomotor ability to the on-board computer.

* * * * *